Nov. 14, 1961  E. LONGFELLOW  3,008,737
GAS APPLIANCE CONNECTOR
Filed Aug. 20, 1958
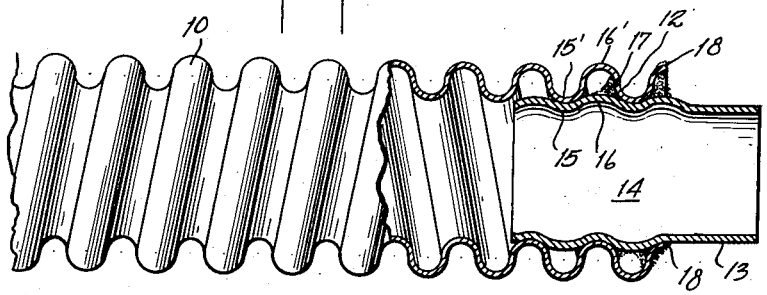
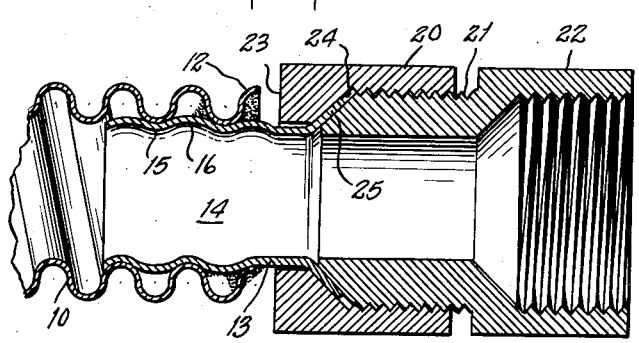
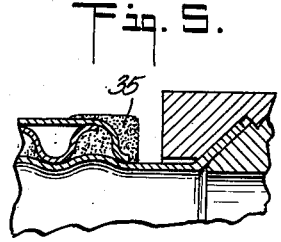
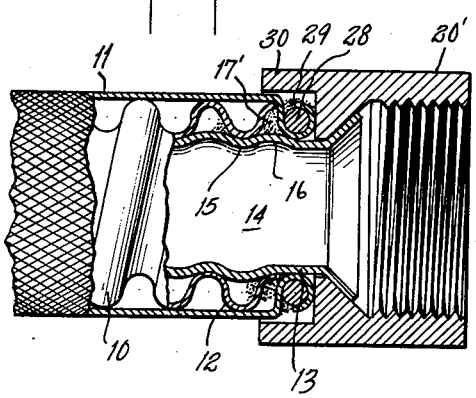
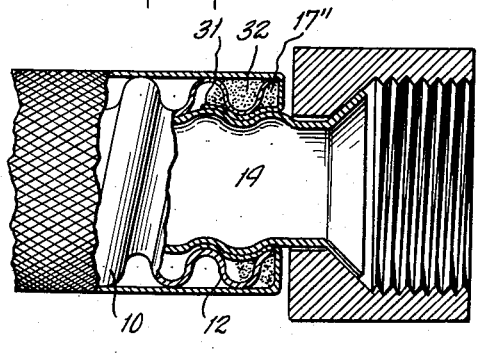
INVENTOR.
EARL LONGFELLOW
BY
ATTORNEYS

United States Patent Office 3,008,737
Patented Nov. 14, 1961

3,008,737
GAS APPLIANCE CONNECTOR
Earl Longfellow, 421 W. 21st St., New York, N.Y.
Filed Aug. 20, 1958, Ser. No. 756,191
3 Claims. (Cl. 285—149)

This invention relates to flexible corrugated metallic tubes of the type used as gas appliance connectors and has for its primary purpose the provision of an improved method of joining to such connectors the fittings by which the same are connected to gas appliances and to house piping.

To assure that connectors of the indicated type are designed to have substantial and durable construction and will provide safe and efficient performance, their construction is hedged by certain basic requirements which must be satisfied before they can be approved for use with gas appliances. Among other things, such connectors should be corrosion resistant to sulphides, should not require the use of gaskets to assure gas tightness of the fittings, and should be capable of withstanding a temperature of 1000° F. without leakage. Further, such connectors should be able to make a leak-proof connection with a low torque tightening of the fitting not to exceed 400 lb.-in. per inch of tubing diameter. Also, the connector should not leak when after being so connected, it is disconnected and then reconnected by the application of a torque not exceeding such 400 lb.-in. per inch of tubing diameter. An attached connector should be able to withstand, without leakage and without becoming detached, a steady lengthwise pull of 800 lbs. per inch of nominal inside diameter for five minutes. It should also not leak, break or be otherwise adversely affected by the application of a tightening torque of 1040 lb.-in. per inch of nominal tubing diameter. Notwithstanding these precautions, these connectors have been found to have certain inherent defects which prevent them from being completely safe. Thus, the usual method of joining the fittings on such connectors has been by a weld because it provides a simple, relatively inexpensive, fluid-tight joint. However, the sulfur in illuminating gas slowly corrodes the metal usually employed for such a weld and in time the metal becomes deteriorated to the extent that the fitting drops off. This can and has resulted in extensive damage and presents a problem for which those in the industry have been diligently seeking a solution. It will be understood that the situation can be taken care of through the use of complicated and expensive equipment. The need is for a simple construction that can be made with greatly reduced manufacturing costs and in quantity production.

I have found that a satisfactory solution to the problem is arrived at by providing an anchoring member for the fitting, which member is attached to the connector by a compound connection constituted of a mechanical bond that will not become weakened because of any corrosive action by the sulfur in the gas and a solder seal capable of making the mechanical bond fluid-tight. Thus the strength of the attachment is in the mechanical bond which should the solder deteriorate under the action of the sulfur in the illuminating gas, will permit a slow leak but will not lessen its hold on the anchoring member because of such deterioration of the solder. The slow leak of illuminating gas enables the defective connector to be detected before extensive damage can result from the failure of the connector.

The advantages of my improved connector, as well as the novel features of construction thereof, will become more apparent from the following description, when read in connection with the accompanying drawings, in which FIG. 1 is an elevational view, partly in longitudinal section of one end of a connector hose with an anchoring member for a fitting attached to the hose in accordance with the present invention;

FIG. 2 is a longitudinal sectional elevation through the end of the hose shown in FIG. 1 and fitting and coupling members connected to such hose;

FIG. 3 is a longitudinal sectional elevation through the end of a hose having a braided sheath enclosing the same and provided with anchoring and fitting members in accordance with the invention;

FIG. 4 is a view similar to FIG. 3 but showing another method of anchoring the end of the sheath in place on the tube; and FIG. 5 is a partial longitudinal sectional elevation of the end of a hose to illustrate another method of anchoring the end of the sheath in place on the end of the tube.

In the drawings, the reference numeral 10 indicates generally the flexible metallic hose or tube of the connector. The tube is of the helically corrugated type and may be constructed in any suitable manner known to the art to accomplish the purposes for which it is to be utilized. The tube may be surrounded by a braid or sheath 11 in the customary manner as shown in FIGS. 3 and 4 of the drawings. In accordance with the present invention, the end portion 12 of the hose surrounds a bushing or ferrule 13 which projects out of and extends a substantial distance beyond the end portion of the hose. The ferrule 13 is preferably constituted of a brass material known as 70/30 spinning brass and initially was a plain tube having an outside diameter less than the inside diameter of the hose so that it could be inserted readily into said hose end portion 12. After the tube was inserted into the hose a distance sufficient to enable a mechanically strong joint to be formed between the two, the inserted portion 14 thereof was expanded into mechanically interlocked engagement with the hose. This may be accomplished in any suitable manner known to the art, as by the use of a standard type of expander when assembling the ferrule and hose. It will be noted in the drawings, that as a result of this operation, the inserted portion 14 of the ferrule will be deformed into a helical corrugated shape with the helically shaped groove 15 impressed thereon in tight engagement with the inner surface of the helical groove 15' in the hose and the expanded or outwardly distorted, helically shaped thread-like portion 16 thereof arching into the inner open end of the spiral thread-like part 16' of the hose. The portion 14 of the ferrule is as a result of this construction effectively interlocked with the hose portion 12 to form a strong mechanical joint therebetween. The end of the ferrule inside the hose may be left with a small radius (note FIG. 1) so that stresses will be minimized at the terminal end of the ferrule when the hose is flexed at this point.

The exterior surfaces of ferrule portion 14 and the interior surface of the hose portion 12 are further bonded together and a fluid-tight seal is formed therebetween by brazing or soldering such surfaces together. In ths soldering operation the porosity of the mechanical bond is utilized to obtain a penetration of the solder throughout substantially the entire length of such bond. Any suitable solder known to the art for use as a fluid sealant may be flowed in between the portions 12 and 14, such as for example, a lead or lead-in solder, or a high temperature solder made of silver and copper. The construction is especially advantageous for the accomplishment of high temperature brazing. Usually high temperature solders will not bond readily when the two surfaces which are to be united are more than 0.003 inch apart. The tolerance for dimensions of such minuteness is difficult to maintain in commercial manufacture and as a result extreme care must be taken to provide a good bond. Due to the close contact between the surfaces of the portions 12 and 14 in the instant construction, however, it is possible to make a better weld with relative ease. The sealant solder material which is indicated in the drawings by the reference numeral 17, penetrates into the interstices between the surfaces 15, 15' to seal such surfaces together and penetrates into the chambers formed by the surfaces 16, 16' to close and seal the joints along the sides of the helically shaped surfaces 15, 15'. Preferably also the terminal open portion of thread-like portion 16' is filled with the solder which is applied so that it covers the exposed metal edge of such portion as indicated at 18 in FIG. 1 of the drawing.

After the ferrule 13 has been assembled on end portion 12 of the hose, the fitting to be mounted thereon is slipped on the exposed end of such ferrule. Such fitting may be of any suitable construction known to the art. Thus, as shown in FIG. 2 of the drawings, the fitting may be constituted of a steel coupling nut 20 having an internally threaded surface arranged for threaded engagement with the external threaded surface 21 on a standard adapter 22. The nut 20 has an inwardly extending flange 23 provided with an internal conically-shaped seat 24 engaged by the conically-shaped flared end 25 of the ferrule which is spread out in any suitable manner after the fitting 20 has been mounted on the ferrule. The inner end of the adapter 22 is provided with a conical taper corresponding to that of seat 24 and flare 25 and coacts with the latter to provide a fluid-tight joint when the adapter and the fitting 20 are screwed tightly together.

It will be observed from the foregoing discussion of the construction shown in FIGS. 1 and 2 of the drawings, that the ferrule 14 is connected to the end of the hose by a twofold bond formed by the distortion of the material of the ferrule against the substantially unaffected structure of the hose end and by the seal provided by the solder between such parts. The metal material of the ferrule is as thick as the metal of the hose end and may be even thicker than the latter to enhance the strength of the bond. The corrugated construction of the hose end imparts sufficient rigidity to such end for the satisfactory formation of a strong mechanical bond with the ferrule. The resulting outwardly distorted metal of the ferrule which is expanded into the helical cavity defined by the thread-like portion 16' of the hose end 12, will hold the ferrule securely connected to the hose even though the sulfur in the gas may eat away the solder material. Thus, even though the seal may fail, there is no danger of the fitting becoming disconnected with the resultant hazardous condition that is likely to be created by the free flow of the gas into the surrounding atmosphere. Such gas as will escape upon failure of the seal will be in relatively small quantities because of the close engagement of surfaces in the mechanical bond and sufficient to warn of the condition, but not to be dangerous. The mechanical bond further assumes the major load of any stresses to which the connector may be subjected in usage, thus relieving the bonding metal from the major portion of such stresses. Because of the construction of the mechanical bond, the effect of such stresses on the bonding metal will be in the nature of a shearing stress rather than a tensile stress, whereby the greater strength of the bonding metal is utilized against rupture under such stresses.

When the hose is provided with the customary braid or sheath 11 shown in FIG. 3 of the drawings, means are provided for securing the associated end of the braid securely to the hose end 12. As indicated in FIG. 3 of the drawings, such means may comprise a clamping element 28 which clamps the end portion of the braid drawn over the end of the hose and under a slight tension to the exterior surface of the projecting portion of the ferrule 13. The terminal edge of the braid is then permanently secured in protected position by solder 29 which penetrates through the interstices of the braid and becomes unified with the clamping member 28, the underlying portion of the ferrule and the solder 17' on the end of the hose. These parts therefore form an additional seal between the hose and the ferrule thus assuring the fluid-tight condition of the latter. This additional seal may be protected in usage by providing an inner longitudinal flange 30 on the fitting 20' so that it overlies and conceals such seal.

In the construction shown in FIG. 4 of the drawings, the end 31 of the braid is inserted into the end of the hose and is locked in position between the hose wall and the outwardly distorted portion of the ferrule. A solder metal may be flowed through the end of the braid into the space in back of the first hose convolution and into a united condition with the solder 17" provided on the inner end of the hose to securely interlock all parts at the end of the hose.

The end of the braid may also be secured in place by embedding it in a solder lug 35 cast over the ends of the braid and hose and an external portion of the ferrule adjacent to the hose end, as shown in FIG. 5 of the drawings. The lug 35 may be cut with the aid of a mold in a manner well known in the art.

It will be understood that while the hose construction of my invention has hereinabove been more particularly described for use as a gas connector, its use is not limited to gases. For example, it is within the contemplation of the invention to use the device for carrying liquids or steam under pressure and at elevated temperatures. The advantages of its use in this connection are similar to that described in its use for carrying gas, the principal one being that if the sealant softens or melts as a result of an unusual condition, notice of such condition will be immediately given by the escaping fluid to the operator, while the stronger mechanical joint will hold to prevent the condition from being hazardous. Further, while I have hereinabove described and illustrated in the drawings, preferred embodiments of my invention, it will be understood by those skilled in the art that various changes and modifications may be made therein without departing from the spirit of the invention or the scope of the appended claims.

I claim:

1. A hose connection comprising a flexible corrugated metal hose for conveying fluid, and coupling means carried by and connected in fluid-tight relation to an end of said corrugated hose, said coupling means including a relatively short cylindrical ferrule inserted for a part of its length into said hose end so that it projects outwardly from such hose end, a part of the corrugated hose enclosing said inserted ferrule part having substantially the same configuration and dimensions as the main body of the hose, and said inserted ferrule part being in sealing engagement with at least two encircling grooved portions formed in such corrugated hose part, said inserted ferrule part being swaged outwardly against said corrugated hose part to cause encircling grooved portions formed therein to mate in sealing engagement with the inner surfaces of said two encircling grooved hose portions and to cause the portion of said inserted ferrule part intermediate said two encircling grooved hose portions to bulge outwardly into the space between said two encircling grooved hose portions and thereby to mechanically interlock said ferrule onto said hose end, the area of engagement of the encircling grooved portions of said inserted ferrule part with the inner surfaces of said two encircling grooved hose portions being of substantial width and extending substantially continuously throughout at least 360 degrees of said hose part in metal to metal sealing contact, and closure means placed between the end of said corrugated hose and the end of said inserted ferrule which extends into said corrugated hose in the internal space formed between any two encircling grooved hose portions which are in sealing engagement with said inserted ferrule whereby the escape of fluid through said space is prevented, the outer projecting part of said ferrule extending outwardly from said hose part being provided with an outwardly projecting flange, and a fitting carried by said outer projecting part and secured to the latter by said flange.

2. A hose connection such as defined in claim 1, in which said inserted ferrule part forms with said corrugated hose part between said two encircling grooved portions of the latter, an encircling chamber portion having as its inner wall said outwardly bulged portion of said inserted ferrule part, and including solder material located in said encircling chamber portion and bonding together said inserted ferrule part and said corrugated hose part in sealing relation.

3. A hose connection such as defined in claim 1, including a braided sheath covering said hose and extending over and around said hose end towards said ferrule to close the terminal end of said hose radially outwardly from said ferrule, and means uniting such hose closing portion of said sheath to said terminal end of the hose and to the exterior surface of said ferrule adjacent to said terminal hose end, said uniting means comprising solder metal penetrating into and uniting said hose closing portion of the sheath to said terminal hose end and said ferrule surface.

References Cited in the file of this patent

UNITED STATES PATENTS

| | | |
|---|---|---|
| 1,001,842 | Greenfield | Aug. 29, 1911 |
| 1,176,261 | Ziegler | Mar. 21, 1916 |
| 1,847,837 | Klopper | Mar. 1, 1932 |
| 2,132,326 | Stone | Oct. 4, 1938 |
| 2,158,620 | Eastman | May 16, 1939 |
| 2,216,468 | Farrar | Oct. 1, 1940 |
| 2,240,413 | Parker | Apr. 29, 1941 |
| 2,488,229 | Noojin | Nov. 15, 1949 |
| 2,634,786 | Stinchcomb | Apr. 14, 1953 |
| 2,722,437 | Phillips | Nov. 1, 1955 |

FOREIGN PATENTS

| | | |
|---|---|---|
| 573,299 | Germany | Nov. 27, 1929 |